Aug. 3, 1937.  A. W. OEHLER  2,088,970
HARVESTER
Filed Oct. 7, 1936  2 Sheets-Sheet 2
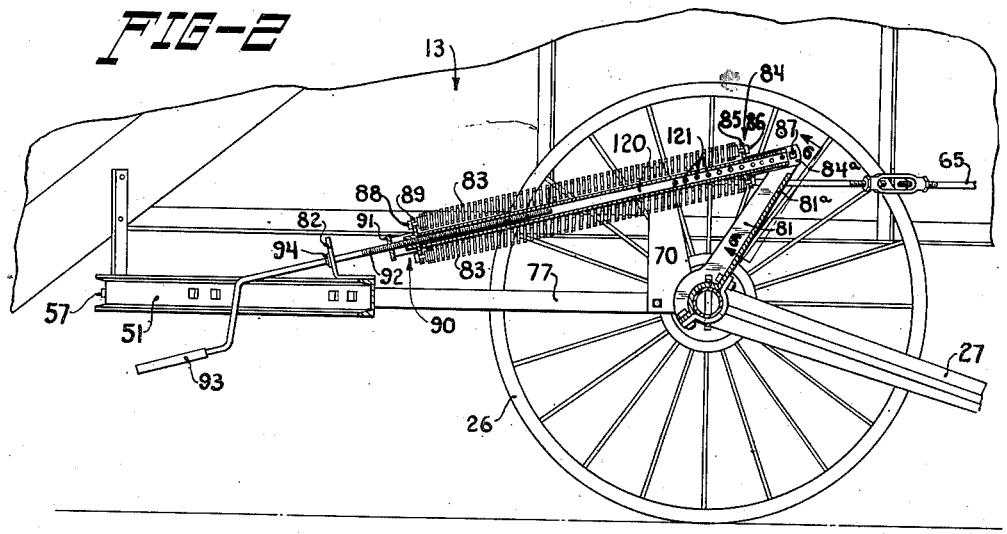
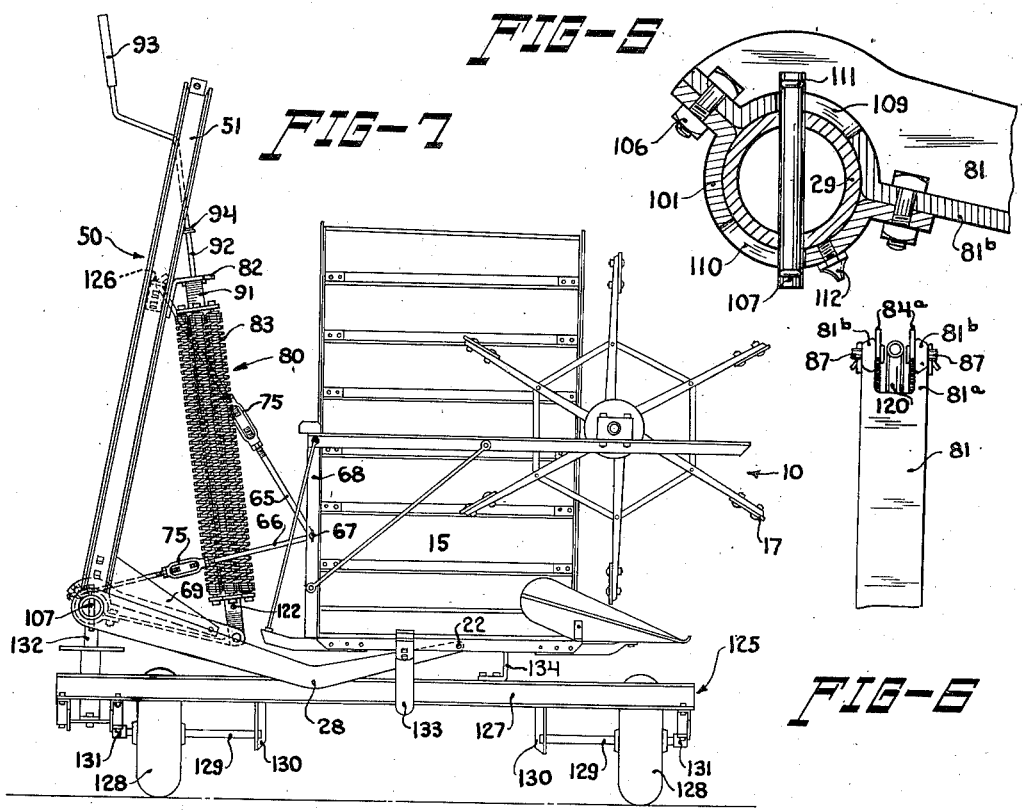
INVENTOR
ALVIN W. OEHLER
BY
ATTORNEYS Patented Aug. 3, 1937

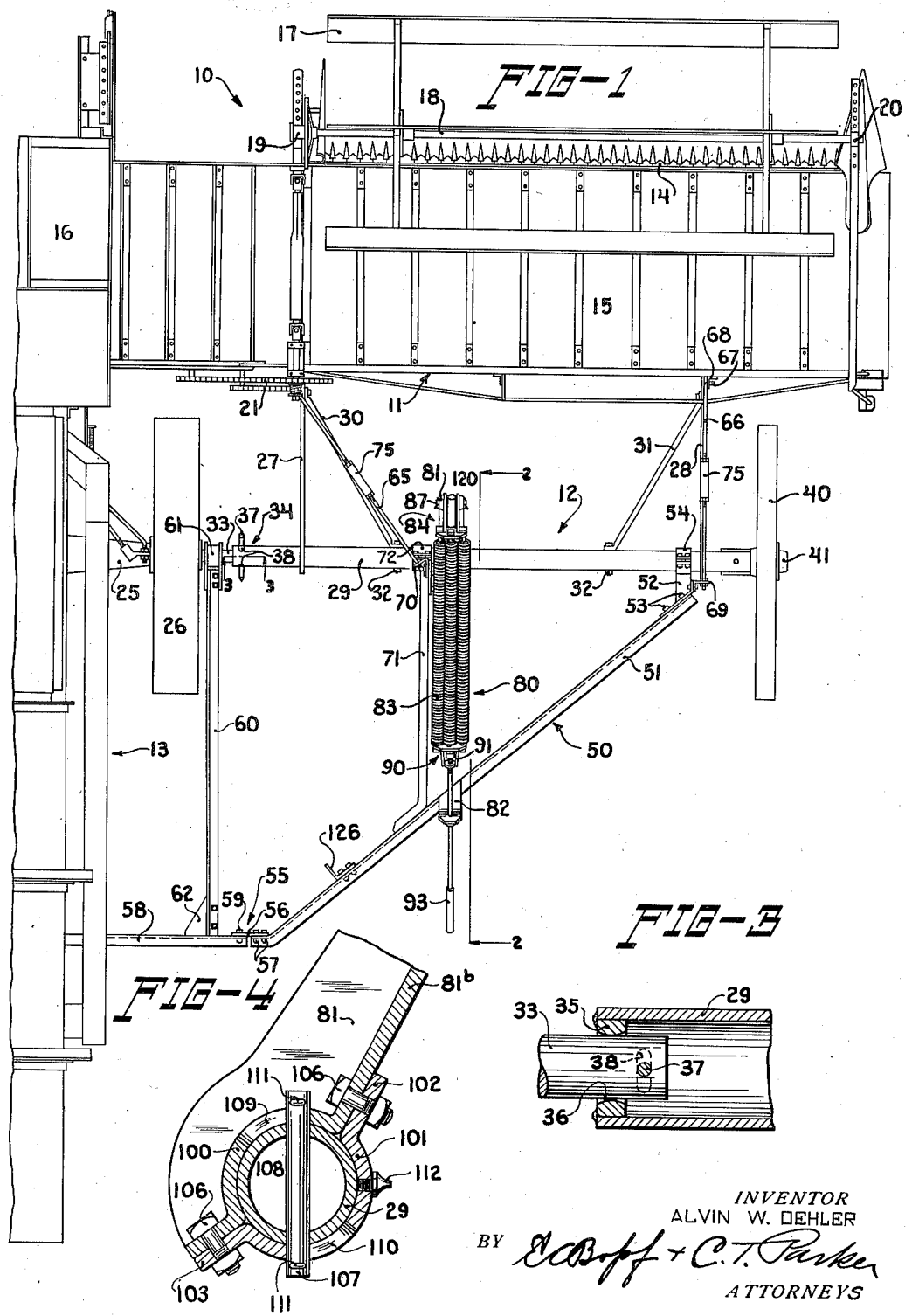

2,088,970

UNITED STATES PATENT OFFICE 2,088,970

HARVESTER

Alvin W. Oehler, Moline, Ill., assignor to Deere & Company, Moline, Ill., a corporation of Illinois Application October 7, 1936, Serial No. 104,443

12 Claims. (Cl. 56—122)

The present invention relates generally to harvesters and more particularly to an improved supporting and counterbalancing structure for a detachable harvester of the type associated with threshers and other agricultural machines.

It is common practice to attach the harvester unit to the thresher by pivot joints, which permit the harvester unit to swing vertically relative to the thresher to accommodate uneven ground surfaces. These pivot joints are of such construction that they can be easily disconnected for detaching the harvester from the thresher for transporting the machine over highways and through gates. Since the height of the harvester unit above the ground must be manually controlled by an operator on the machine, it is desirable and customary to counterbalance the weight of the unit by springs or other means to facilitate raising and lowering. Such springs are generally connected to a crank arm on the harvester unit and anchored back to a point on the frame of the thresher. This construction necessitates disconnecting the springs from the main frame whenever the harvester unit is detached for transport. It is the principal object of the present invention to provide a supporting structure for a harvester unit, the counterbalancing springs of which are made a unitary part of the structure and detachable therewith.

A further object has to do with the provision of means for folding the supporting structure up against the platform of the harvester for compactness during transport without the necessity of disconnecting or of even releasing the tension of the counterbalancing springs.

Another object is concerned with locating the counterbalancing springs so that lifting force of the springs is transmitted equally to both ends of the harvester platform.

In the accomplishment of these objects the springs are connected between a crank arm on the platform structure and an anchorage on another member of the harvester structure itself, so that when the harvester is disconnected from the thresher at the pivot joints, the spring remains on the harvester supporting structure. Spring disabling means are provided to lock the spring-connected parts against relative movement, and a lost motion connection between the crank arm and the platform is provided so that the structure may be folded together without disconnecting the springs.

Other objects will be made apparent by the following disclosure of a specific embodiment of my invention, reference being had to the appended drawings, in which:

Figure 1 is a plan view of a harvester unit attached to a thresher or separator;

Figure 2 is a fragmentary sectional elevational view taken along the line 2—2 of Fig. 1;

Figure 3 is a sectional view taken along the line 3—3 of Fig. 1 showing the details of the forward pivot joint between the harvester and the thresher;

Figure 4 is an enlarged fragmentary view showing the lost motion connection between the crank arm and the platform supporting frame, the arm being shown in normal operating position;

Figure 5 is a view similar to Fig. 4, but showing the parts in transport position;

Figure 6 is a fragmentary elevation of the crank arm and its connection with the spring structure, taken on a line 6—6 of Fig. 2; and, Figure 7 is an elevational view of the harvester with the supporting structure folded for transport, the unit being mounted on a transport truck.

Referring now to Fig. 1, the harvester unit 10 extends laterally from the thresher 13 and comprises a platform 11 carried on a supporting structure 12. The platform 11 is provided with the usual cutter bar 14 disposed transversely to the line of advance and a conveyor 15 which carries the cut grain from the cutter bar into the feeder house 16 of the thresher. A reel 17 is rotatable on a transverse shaft 18, which is supported on bearings 19, 20 above the cutter bar and serves to lay the cut grain upon the conveyor 15. The reel is driven by suitable sprocket and chain mechanism 21 which receives power from the power plant of the main machine in a manner well known to those skilled in the art.

The thresher 13 is supported on axles 25, of which one appears in Fig. 1, the axle being carried by ground wheels 26, one of which is shown. The platform 11 is pivotally supported by pivots, indicated at 22 in Fig. 6, on two arms 27 and 28 which extend rearwardly from the platform to a transversely extending shaft or beam 29 to which they are rigidly connected, as by welding. By virtue of the pivotal connection, the platform can be rocked about the axis of the pivots 22, which extends transversely to the line of advance. This permits the platform to be held level in all positions of vertical adjustment by means which will be described later. Diagonal braces 30 and 31 are bolted to the supporting arms 27, 28, respectively, and converge inwardly and rearwardly to the shaft 29, to which they are fixed by bolts 32. The shaft 29 is supported at its outer end on a ground wheel 40, and at its inner end on an extension 33 of the axle 25 of the thresher, on a universal joint 34, the details of which are shown in Fig. 3.

Referring to Fig. 3, the supporting shaft 29 is hollow and contains a bearing ring 35 welded or otherwise fixed within the end of the shaft. The inner surface 36 of the ring 35 bears on the axle extension 33 and is slidable thereon. The inner surface 36 is rounded, as shown, to permit angular variations between the shaft 29 and the axle 33. Thus when the harvester-thresher is operating on uneven or rolling ground, the harvester unit can pivot vertically relative to the thresher to more nearly conform to the ground surface. The shaft 29 is prevented from sliding axially on the axle 33 by a pin 37 extending through an aperture in the end of the axle 33 and through circumferentially extending slots 38 on opposite sides of the shaft 29, whereby it is thus rotatable on the axle 33 to an extent which is limited by the pin 37 engaging opposite ends of the slots 38.

The platform 11 can be raised and lowered by the operator by suitable means which are well known to those skilled in the art, to adjust the height of cutting. As the platform is raised and lowered, the supporting arms 27, 28 and the shaft 29 rotate about the axis of the shaft. The outer end of the shaft rotates in the journal bearing 41 of the supporting wheel, while the inner end rotates on the axle extension 33.

As the implement advances, the longitudinal reaction against the shaft 29 is resisted by a bracing structure 50 which constitutes a part of the supporting structure 12 and comprises a bracing member 51 connected to a bracket 52 at its forward end by bolts 53, the bracket 52 being supported on the shaft 29 near its outer end by a journal bearing 54. The bracing member 51 extends diagonally rearwardly and substantially horizontally, the rear end being pivotally connected to the frame of the thresher by a pivot joint 55, which comprises a plate 56 bolted rigidly to the end of the bracing member 51 by bolts 57 and connected to a transversely extending frame member 58 of the thresher frame by a pivot bolt 59. The pivot bolt 59 is substantially at the same elevation and in longitudinal alignment with the inner end of the shaft 29. Therefore, as the outer supporting wheel 40 rolls over uneven ground, the supporting structure 12 of the harvester swings vertically about a horizontal longitudinal axis passing through the bolt 59 and the inner end of the shaft 29.

A longitudinally extending bracing member 60 is bolted at its forward end to a bracket 61 on the axle 33, and is connected to the transverse frame member 58 by a gusset plate 62 at its rear end.

As the platform is raised and lowered about the axis of the shaft 29, the platform is held substantially level by an arrangement of links consisting of a pair of tie rods 65 and 66 spaced apart laterally and disposed at an elevation above the shaft 29. The forward ends of the rods are bent to form hooked portions 67, which are inserted through apertures in vertically extending angle members 68, respectively, at the rear of the platform. The outer brace 66 extends rearwardly and is connected to an upright member 69, which is attached to the diagonal brace 51 by the bolts 53. The inner brace 65 extends diagonally rearwardly and outwardly, and is connected to a second upright member 70 which is carried on a longitudinal bracing member 71, the latter being connected to the transverse shaft 29 by a journal bearing member 72 and bolted at its rear end to the diagonal brace 51. As the platform raises and lowers on the arms 27 and 28, the tie rods 65, 66 swing up and down with the platform and since they lie in a plane which is substantially parallel to a plane passing through the shaft 29 and pivots 22, they maintain the rear angle members 68 in fixed angular relation to the upright members 69, 70, the platform pivoting at the ends of the arms 27 and 28 and thus remaining level with respect to the ground. The lengths of the rods 65 and 66 are adjustable by means of turnbuckles 75, by which the level of the platform can be adjusted.

The weight of the platform and associated structure is counterbalanced to facilitate vertical adjustment, by means of a counterbalancing spring structure 80 connected between a crank arm 81 on the shaft 29, and an angle member 82 fixed to the diagonal brace 51. The crank arm 81 is disposed between the two arms 27, 28 and approximately at the center of the supporting structure in order to balance the counterbalancing forces transmitted through the shaft 29 to the arms 27, 28.

The counterbalancing spring structure 80 comprises a cluster of coil springs 83 connected at their forward end to a terminal member 84 having an annular flange 85 to which the springs are connected by bolts 86. The crank arm 81 is a channel shaped member, the end of which has the web 81a cut back to provide a pair of spaced ears 81b, as best illustrated in Figure 6. The terminal member 84 is also provided with a pair of ears 84a spaced to lie adjacent the ears 81a, respectively, and pivoted thereto by pivot bolts 87. The opposite ends of the springs are connected by bolts 88 to the annular flange 89 of a terminal member 90, which has a tapped opening for receiving an adjusting screw 92. The screw is in the form of a threaded rod disposed in the center of the spring cluster, and extending rearwardly through a guide 91 on the member 90 and an aperture in the angle member 82, and terminating in a crank 93. A collar 94 fixed to the shank of the screw 92 bears against the upwardly turned flange of the angle member 82 to resist the tension of the springs. Hence by turning the crank 93 the terminal member 90 will be moved along the screw 92 to increase or decrease the tension of the springs 83 and thus adjust the amount of counterbalancing force exerted upon the crank 81.

The web 81b at the lower end of the crank arm 81 is curved as at 100 to fit the cylindrical surface of the shaft 29, as shown in Fig. 4. A complementary bearing cap 101 has ears 102 and 103 which are bent to lie in juxtaposition with the straight portions of the crank arm web 81b and secured thereto by bolts 106 to provide a journal bearing, whereby the arm 81 can rotate freely on the shaft 29. A lost motion connection between the arm 81 and the shaft 29 is provided by means of a pin 107, inserted through an aperture 108 in the shaft 29, and extending through circumferentially extending slots 109, 110 in the crank arm journal bearing 100 and the bearing cap 101, respectively, and secured by suitable cotter pins 111. The crank arm 81 is thus rotatable on the shaft 29 within the limits of travel of the pin 107 in the slots 109, 110. The bearing surfaces are lubricated through a fitting 112. In Fig. 4 the arm 81 is shown rotated counter-clockwise until the ends of the slots 109, 110 are in contact with the pin 107. This is the normal operating position of the parts, the counterbalancing spring urging the arm 81 in a counter-clockwise direction while the weight of the platform tends to rotate the shaft 29 in a clockwise direction, as viewed in Fig. 4, the two forces being in substantial equilibrium. The counterbalancing force can be increased or decreased by tightening or loosening the spring tension and the counterbalancing springs 83. This is accomplished by turning the crank 93 in one direction or the other to move the terminal member 90 axially relative to the other member 84.

Before removing the harvester unit for transport, it is necessary to relieve the tension of the counterbalancing springs 83, or otherwise disable them. It is customary to provide spring disabling means for locking the spring-connected parts together, thus saving the labor of cranking the spring adjusting screw 92 until the springs 83 are completely relaxed. The preferred means for locking the parts is shown in Fig. 2. A tube or pipe 120 is fixed to the adjustable terminal member 90 at one end and extends axially through the center of the spring cluster, embracing the screw 92 and providing a guide therefor. The opposite end of the tube 120 extends through the terminal member 84, and between the pivot ears 84a, and is provided with a plurality of spaced apertures 121 adapted to register with apertures in the terminal member 84 in different positions of adjustment of the springs. Hence, to lock the springs in tension it is only necessary to insert a pin or bolt 122 (Fig. 7) through apertures 121 and the registering holes in the ears 84a of the member 84. It may be necessary to screw the opposite member 90 slightly in one direction or the other to properly align the apertures 121 with those in the member 84 before inserting the bolt 122.

After the pipe 120 and the terminal member 84 are bolted or pinned together, thus locking the crank arm 81 with the bracing structure 50 in relatively fixed relation, the harvester unit can be removed for transport. This is preferably accomplished by rolling a transfer truck 125 (Fig. 7) under the platform 11, then disconnecting the pivot joints 34, 55 as described, and the other connections to the thresher such as the driving mechanism and lifting controls.

To make the harvester more compact for transport, the bracing structure 50 is adapted to be folded up against the platform, as illustrated in Fig. 7 after first disconnecting the rear ends of the tie rods 65, 66 from the uprights 69, 70. In folding, the journals 54, 72, as well as the crank arm 81, turn on the shaft 29, until the pin 107 engages the other ends of the slots 109, 110 as shown in Fig. 5, whereby the bracing structure 50 is held by gravity in the position shown in Fig. 7. As the bracing structure 50 is folded, the rod 92 slides through the angle member 82 until the latter bears against the guide 91. The structure is then secured in this position by connecting the inner tie rod 65 to an ear 126 fixed on the bracing member 51 by bolts, or otherwise. The ear 126 is provided with an aperture adapted to receive the hook at the rear end of the tie rod.

The transfer truck 125 comprises a structural frame 127 supported on wheels 128, the latter being rotatably mounted on axles 129, supported in brackets 130, 131.

The harvester is secured to the transport truck by a number of brackets or fixtures 132, 133, 134 which are fixed on the truck and are provided with suitable clamping means adapted to engage various parts of the frame of the harvester and its supporting structure. The outer supporting wheel 40 is removed from the shaft 29 during transport.

I claim:

1. In a harvester-thresher having a main wheel supported frame and a harvester unit extending laterally therefrom, means for supporting said harvester unit comprising a transversely extending shaft swingably supported at the inner end thereof on said frame, a supporting wheel for the outer end of said shaft, brackets rigidly fixed to said shaft and attached to said harvester unit, a bracing member journaled to said shaft near the outer end thereof and swingably connected to said main frame at a point rearward of the inner end of said shaft, and tensioned spring means connected between said shaft and said bracing member for counterbalancing the harvester unit.

2. In a harvester unit for an agricultural machine, a platform, a supporting frame therefor, said frame extending rearwardly to provide for raising and lowering said platform about a transverse axis disposed rearwardly of said platform, a horizontal bracing member connected to said frame and extending diagonally rearwardly therefrom, and spring means connected between said brace and said frame for counterbalancing the platform.

3. In a harvester unit for an agricultural machine, a platform, a rearwardly extending frame therefor to provide for raising and lowering said platform about a transverse axis disposed rearwardly of said platform, a horizontally disposed bracing structure extending rearwardly from said frame, said frame being pivotally mounted relative to said structure, and spring means connected between said frame and said structure for counterbalancing said platform.

4. In an agricultural machine having a wheel supported frame and a harvester unit associated therewith, a supporting structure for said harvester unit comprising interconnected horizontally disposed members pivotally connected to said frame at fore and aft spaced points and a supporting wheel journaled at the outer end of said structure, said structure including a part adapted for a limited amount of rotation about an axis extending transversely relative to the direction of advance of said machine, said harvester unit being fixed to said rotatable part, and a counterbalancing spring connected between parts of said supporting structure between said outer supporting wheel and said pivotal connections to said frame.

5. In an agricultural machine having a wheel supported frame and a harvester unit associated therewith, a supporting structure for said harvester unit comprising interconnected horizontally disposed members pivotally connected to said frame at fore and aft spaced points and a supporting wheel journaled at the outer end of said structure, said structure including a part adapted for a limited amount of rotation about an axis extending transversely relative to the direction of advance of said machine, said harvester unit being fixed to said rotatable part, and a counterbalancing spring connected between parts of said supporting structure substantially at the center thereof.

6. A harvester unit adapted to be attached to an agricultural machine, said unit comprising a platform, supporting means for said platform including a transversely extending shaft disposed rearwardly of said platform, a supporting wheel journaled at the outer end of said shaft, said shaft being swingably supported at the inner end thereof on said machine, supporting brackets fixed to said shaft and extending forwardly and connected to said platform, a bracing structure journaled on said shaft and extending rearwardly therefrom, said bracing structure being pivoted to said machine at a point substantially in longitudinal alignment with the inner end of said shaft, an arm connected to said shaft, and a counterbalancing spring connected between said arm and said bracing structure for counterbalancing the weight of said platform.

7. A harvester unit adapted to be attached to an agricultural machine, said unit comprising a platform, supporting means for said platform including a transversely extending shaft disposed rearwardly of said platform, a supporting wheel journaled at the outer end of said shaft, said shaft being swingably supported at the inner end thereof on said machine, supporting brackets fixed to said shaft and extending forwardly and connected to said platform, a horizontally disposed bracing structure journaled on said shaft and extending rearwardly therefrom, said bracing structure being pivoted to said machine at a point substantially in longitudinal alignment with the inner end of said shaft, a crank arm connected to said shaft, spring means connected between said arm and said bracing structure for counterbalancing said platform, and means for locking said arm and said bracing structure in various relative positions, there being lost motion provided in the connection between said crank arm and said shaft to permit the bracing structure, when locked to said arm, to be folded vertically against said platform to facilitate transporting said harvester.

8. A harvester unit adapted to be attached to an agricultural machine, said unit comprising a platform, supporting means for said platform including a transversely extending shaft disposed rearwardly of said platform, a supporting wheel journaled at the outer end of said shaft, said shaft being swingably supported at the inner end thereof on said machine, supporting brackets fixed to said shaft and extending forwardly and connected to said platform, a horizontally disposed bracing structure journaled on said shaft and extending rearwardly therefrom, said bracing structure being pivoted to said machine at a point substantially in longitudinal alignment with the inner end of said shaft, a crank arm journaled on said shaft, means for connecting said arm to said shaft but allowing a limited amount of lost motion therebetween, a counterbalancing spring connected between said arm and said bracing structure, and spring disabling means for locking the spring-connected parts together, whereby the lost motion connection permits the bracing structure, when said spring is disabled, to be folded against said platform when said harvester is detached from said machine.

9. A harvester unit adapted to be attached to an agricultural machine, said unit comprising a platform, supporting means for said platform including a transversely extending shaft disposed rearwardly of said platform, a supporting wheel journaled at the outer end of said shaft, said shaft being swingably supported at the inner end thereof on said machine, supporting brackets fixed to said shaft and extending forwardly and connected to said platform, a horizontally disposed bracing structure journaled on said shaft and extending rearwardly therefrom, said bracing structure being pivoted to said machine at a point substantially in longitudinal alignment with the inner end of said shaft, a crank arm having a sleeve portion journaled on said shaft, said sleeve portion having a slot therein, a pin fixed to said shaft and disposed in said slot to limit the relative motion between said arm and said shaft, a counterbalancing spring connected between said arm and said bracing structure, and spring disabling means for locking the spring-connected parts together, whereby the lost motion connection permits the bracing structure, when said spring is disabled, to be folded against said platform when said harvester is detached from said machine.

10. In a harvester unit for an agricultural machine, a platform, means for supporting said platform including a transversely extending shaft swingably supported at the inner end thereof on said machine, a supporting wheel for the outer end of said shaft, a crank arm connected to said shaft substantially midway between the ends thereof, a bracing member journaled to said shaft near the outer end thereof and pivotally connected to said machine at a point rearward of the inner end of said shaft, a counterbalancing spring connected between said crank arm and said bracing member, and a second bracing member fixed to the first-mentioned bracing member adjacent to said spring connection and extending substantially coextensively with said spring, said second bracing member being journaled on said shaft.

11. A harvester unit adapted to be attached to an agricultural machine, said unit comprising a platform, supporting means for said platform including a transversely extending shaft disposed rearwardly of said platform, a supporting wheel journaled at the outer end of said shaft, said shaft being swingably supported at the inner end thereof on said machine, supporting brackets fixed to said shaft and extending forwardly and connected to said platform, a horizontally disposed bracing structure journaled on said shaft and extending rearwardly therefrom, said bracing structure being pivoted to said machine at a point substantially in longitudinal alignment with the inner end of said shaft, a counterbalancing spring, means for connecting said spring between said platform supporting means and said bracing structure, and means for disabling said spring, there being lost motion provided in said spring connecting means to permit the bracing structure to be folded vertically against said platform when said spring is disabled, to facilitate transporting said harvester.

12. A harvester unit adapted to be attached to an agricultural machine, said unit comprising a platform, supporting means for said platform including a transversely extending shaft disposed rearwardly of said platform, a supporting wheel journaled at the outer end of said shaft, said shaft being swingably supported at the inner end thereof on said machine, supporting brackets fixed to said shaft and extending forwardly and connected to said platform, a horizontally disposed bracing structure journaled on said shaft and extending rearwardly therefrom, said bracing structure being pivoted to said machine at a point substantially in longitudinal alignment with the inner end of said shaft, a counterbalancing spring, means for connecting one end of said spring to said bracing structure, an arm connected to said shaft, means for connecting the other end of said spring to said arm, and means for disabling said spring, there being lost motion provided in at least one of the connections between said spring connected parts, whereby, when said spring is disabled, the bracing structure can be folded vertically against said platform to facilitate transporting said harvester.

ALVIN W. OEHLER.